May 6, 1958     A. M. WIGGINS     2,834,000

SOUND DETECTING DEVICE

Filed Dec. 9, 1953     2 Sheets-Sheet 1

Inventor
Alpha M. Wiggins
By Alois W. Graf
attorney

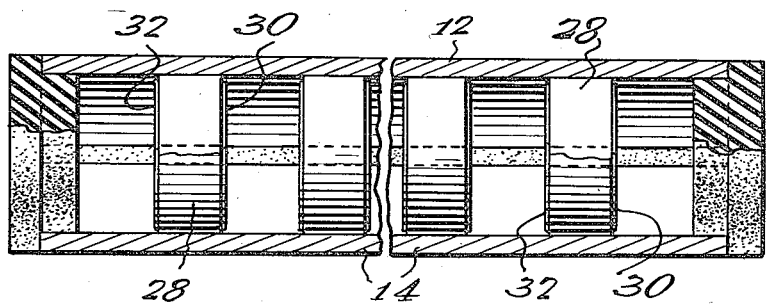
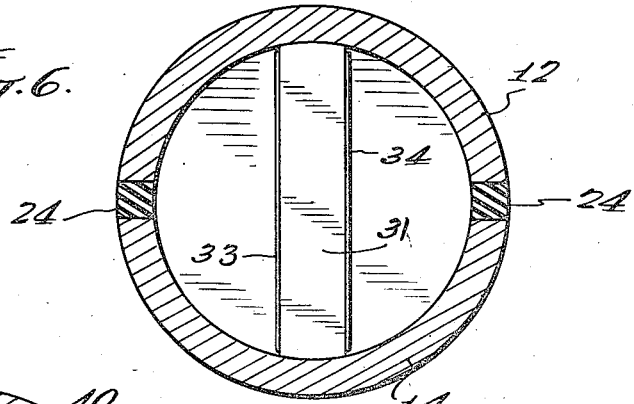
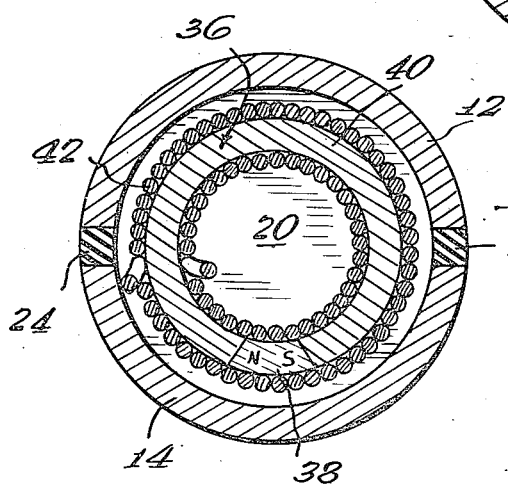

United States Patent Office 2,834,000
Patented May 6, 1958

2,834,000

SOUND DETECTING DEVICE

Alpha M. Wiggins, Buchanan, Mich., assignor to Electro-Voice, Incorporated, Buchanan, Mich.

Application December 9, 1953, Serial No. 397,077

10 Claims. (Cl. 340—8)

The present invention relates to devices responsive to sound, particularly devices responsive to sound under the surface of a liquid, such as water.

In the past, underwater sound has been detected by devices of various types. One type of sound responsive device utilizes a hollow barium titanate cylinder with plugs on either end and electrodes on the inner and outer surfaces of the hollow cylinder. The occurrence of sound pressure causes the diameter dimension of the hollow cylinder to change resulting in the generation of an electrical signal. In such a device, the force operating to change the diameter of the hollow cylinder is equal to the product of the sound pressure and the area of the outer surface of the hollow cylinder.

It is an object of the present invention to provide a device for detecting sound in which the force operating to produce the electrical signal is greater than the product of the sound pressure and the external surface of the electro-mechanical transducer. In this manner, a device may be provided having the advantage of producing an electrical signal of greater magnitude with a given electromechanical transducer than the devices presently known to the art.

It is also an object of the present invention to provide a sound responsive device in which the size and amount of material used for the electro-mechanical transducer has been minimized without reducing the response thereof. In this manner, the cost of the sound detecting device may be minimized.

Further, it is an object of the present invention to provide a sound responsive device which is particularly useful for the detection of underwater sounds.

Other objects and advantages of the present invention will become readily apparent to the man skilled in the art from a further reading of this specification, particularly when viewed in the light of the drawings, in which:

Figure 5 is a vertical sectional view of another embodiment of the present invention;

Figure 6 is a transverse sectional view of another embodiment of the present invention; and Figure 7 is a transverse sectional view of still another embodiment of the invention.

Figure 1:
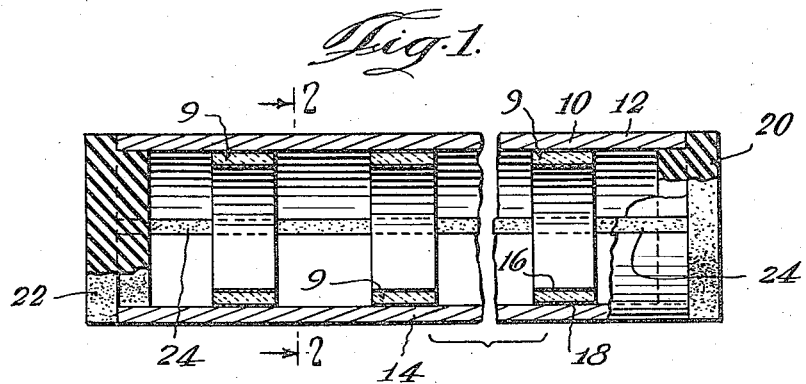
Figure 1 is a longitudinal sectional view of a sound detecting device constructed according to the teachings of the present invention.

In elementary form, a sound detecting device constructed according to the present invention has at least one electro-mechanical transducer disposed within a segmented hollow member in contact with each of the segments of the member. Figure 1 illustrates such a device utilizing three electro-mechanical transducers designated 9, which have hollow piezoelectric cylinders 10 disposed within a much longer pair of substantially semicylindrical members 12 and 14, which for purposes of simplicity will be termed semicylinders although it will be understood that a gap is disposed between the members.

One electrode 16 is affixed to the inner surface of each hollow cylinder 10, and the other electrode 18 is affixed to the outer surface of each cylinder 10 and contacts both the cylinder 10 and the semicylinders 12 and 14. A pair of plugs 20 and 22 preferably resilient, seal the ends of the semicylinders 12 and 14, and elastic sealing means 24, such as rubber cement or rubber tape, seals the seams between the semicylinders to make the entire unit water tight.

As a result of this construction, the radial force applied to the ceramic hollow cylinders 10 is equal to the product of the sound pressure and area of the outside surfaces of the semicylinders 12 and 14 which are attributable to each hollow cylinder 10.

In a particular construction of the sound detector, the semicylinders are constructed of aluminum approximately ⅛ inch thick and have an inner diameter of approximately ½ inch and a length of approximately 5 feet. The electro-mechanical transducers are constructed with barium titanate cylinders 10 approximately 1/16 inch thick and silver electrodes, the cylinders being spaced from each other by approximately 2 inches.

While Figure 1 illustrates a sound detector using three electro-mechanical transducers 9, it will be understood that the invention may be practiced using one or more transducers. However, there is an optimum number of transducers for a segmented cylinder of a given length. If the spaces between the transducers becomes too great, the semicylinders will bend between the transducers with the impact of sound pressure causing a diminution in response. In like manner, if the spaces are too small between successive transducers, optimum response will not be obtained, since the effective area of the semicylinders working upon each transducer will be reduced. The optimum distance between transducers depends principally upon the material and thickness of the semicylinders, although the distance can be increased for larger diameters. It has been found that the optimum distance between transducers for semicylinders constructed of 1/16 inch thick aluminum is approximately from 2 to 4 inches for diameters from ½ inch to 4 inches.

Figure 2:
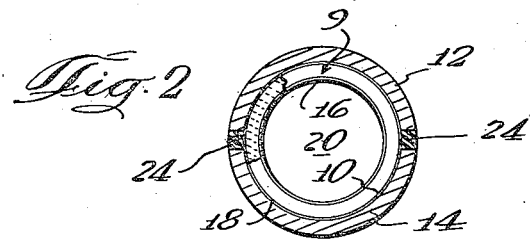
Figure 2 is a vertical section view taken along line 2—2 of Figure 1.
Figure 3:
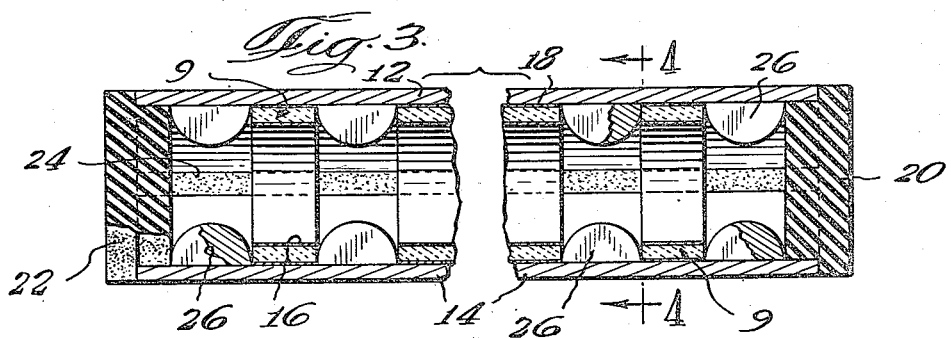
Figure 3 is a vertical sectional view of another embodiment of the present invention.
Figure 4:
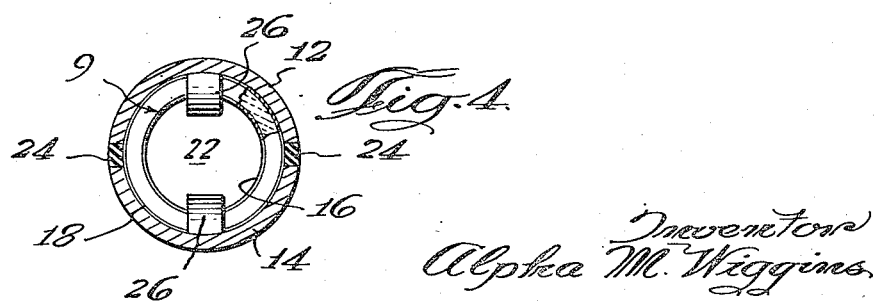
Figure 4 is a transverse sectional view taken along line 4—4 of Figure 3.

The embodiment shown in Figures 3 and 4 permits the use of longer segmented cylinders for a given transducer surface in contact with the segmented cylinder without a loss of response. In this embodiment, the sound responsive device has semicylinders, plugs, sealing means and transducers identical with those shown in Figures 1 and 2, so the same reference numerals will be used for these elements. This embodiment differs, however, in that stiffening members 26 are affixed to each semicylinder 12 and 14 between the electro-mechanical transducers 9. These stiffening members are in the form of solid pieces and are affixed to the surface of the semicylinders 12 and 14 on a longitudinal axis equidistant from the seams of the segmented cylinder. The stiffening members 26 prevent bending of the semicylinders 12 and 14 between successive transducers 9, and thus permit the use of larger spaces between transducers with an increase in response, rather than a loss of response.

Figure 5 shows another modification of the invention. In this construction, piezoelectric discs 28 with electrodes in the form of circular plates 30 and 32 affixed to the flat surfaces of the discs 28 are used as the electro-mechanical transducers. Since the other elements of the combination are identical to those shown in Figures 1 and 2, the same reference numerals as used in Figures 1 and 2 have been used to designate these elements. The plates 30 and 32 are slightly smaller in diameter than the discs 28, so that pressure from the semi-cylinders 12 and 14 will be exerted upon the discs 28. The electrodes may also be formed by plating or sputtering the discs 28 with electrically conducting material, such as silver. One of the advantages of this construction is that the pressure from the semicylinders 12 and 14 is exerted upon the piezoelectric material normal to the electric field, and most materials exhibit the greatest sensitivity under these conditions, particularly barium titanate.

Figure 6 illustrates a sound detecting device constructed according to the present invention which utilizes piezoelectric crystals for transducers. Since these transducers are disposed within a segmented cylinder identical in construction with that shown in Figures 1 and 2, the same reference numerals will be used to designate corresponding parts. The crystals, designated 31, are affixed, usually by cement, between the two semicylinders 12 and 14 at points equidistant from the seams in the segmented cylinder. A pair of electrodes 33 and 34 are affixed to the flat sides of the crystals 31. Since the crystals 31 generate a voltage when compressed or elongated, the voltage developed can be used as an indication of sound wave.

Figure 7 shows an embodiment of the invention in which a magnetostriction transducer is employed. Since this embodiment also has semicylinders, plugs and sealing means identical to those shown in Figures 1 and 2, the same reference numerals will be used to designate these parts. A ring 36 is disposed within the semicylinders 12 and 14 which is provided with a segment 38 which constitutes a permanent magnet and a segment 40 of magnetostrictive material. A coil 42 is wound around the ring 36. The ring 36 is in contact with the two semicylinders 12 and 14, so that the exertion of pressure on the semicylinders 12 and 14 changes the diameter of the ring 36 and generates a voltage in the coil 42.

It will of course be understood that one or more transducers may be used in all of the embodiments, and that the transducers may be serially connected if there are more than one, or they may be connected independently. Also, it is clear that the electrical connections from the transducers may be of any construction known to the art. Further, many modifications and alternatives will be apparent to the man skilled in the art from a reading of the present disclosure, and for this reason, it is intended that the scope of the present invention be not limited by the foregoing disclosure, but rather only by the following claims.

What is claimed is:

1. A sound responsive device comprising, in combination, a plurality of longitudinal segments of a rigid casing, resilient means interposed between said segments, said resilient means and said segments being confined into adjacent relationship forming a hollow member, and an electro-mechanical transducer disposed transversely within the hollow casing member in contact with each segment of the hollow casing member.

2. A sound responsive device comprising, in combination, a plurality of elongated longitudinal segments of a rigid cylinder arranged to be movable transversely to the axis thereof, a pair of resilient circular plugs, the cylinder segments being attached at each end to a plug and disposed in adjacent relationship with each other to form a segmented cylinder, resilient sealing means interconnecting the longitudinal edges of adjacent cylindrical segments, and an electro-mechanical transducer disposed within the cylinder in contact with each segment thereof.

3. A sound responsive device comprising, in combination, a pair of resilient cylindrical plugs, a pair of elongated substantially semicylindrical segments of a rigid metal cylinder arranged to be movable transversely to the axis thereof, each segment having an end attached to each of the plugs to form a hollow bifurcated cylinder, resilient sealing means located between adjacent edges of said segments, and at least one cylindrical electro-mechanical transducer disposed transversely within the cylinder in contact with both segments of the cylinder.

4. A sound responsive device comprising the elements of claim 3 wherein a plurality of cylindrical electro-mechanical transducers are disposed at spaced intervals within the bifurcated cylinder.

5. A sound responsive device comprising the elements of claim 4 in combination with a plurality of ribs attached to each of the segments between successive transducers, said ribs being disposed along a longitudinal axis of each segment.

6. A sound responsive device comprising the elements of claim 3 including an electro-mechanical transducer comprising a hollow cylindrical member of barium titanate, and a pair of electrodes, one electrode being on the outer surface of said member and the other electrode on the inner surface of said member.

7. A sound responsive device comprising the elements of claim 3 wherein the elongated substantially semicylindrical segments are constructed of aluminum and said segments are sealed together by a flexible water seal.

8. A sound responsive device comprising the elements of claim 3 including an electro-mechanical transducer comprising a flat-cylindrical disc of barium titanate, and a pair of electrodes, one of said electrodes being disposed on each of the flat sides of the disc.

9. A sound responsive device comprising, in combination, a pair of resilient cylindrical plugs, a pair of elongated substantially semicylindrical rigid metal segments having an end attached to each of the plugs to form a hollow bifurcated cylinder, resilient means interconnecting the adjacent edges of said semicylindrical segments, at least one piezoelectric element attached between the two segments, and a pair of electrodes disposed upon parallel surfaces of each element.

10. A sound responsive device comprising the elements of claim 3 wherein an electro-mechanical transducer comprises a ring having a segment of a magneto-strictive material and a second segment of magnetically polarized material, and an electrical coil wound about the ring, said ring and coil being snugly disposed within and attached to the semicylinders.

References Cited in the file of this patent

UNITED STATES PATENTS

| | | |
|---|---|---|
| 1,559,158 | Butcher | Oct. 27, 1925 |
| 2,440,903 | Massa | May 4, 1948 |
| 2,452,085 | Turner | Oct. 26, 1948 |
| 2,732,536 | Miller | Jan. 24, 1956 |